US012728433B2

(12) United States Patent
Patil et al.

(10) Patent No.: US 12,728,433 B2
(45) Date of Patent: Sep. 8, 2026

(54) VOLTAGE-ASSISTED PAINTING SYSTEM

(71) Applicant: NISSAN NORTH AMERICA, INC., Franklin, TN (US)

(72) Inventors: Sandeep Patil, Farmington Hills, MI (US); Mohammed Hussain Abdul Jabbar, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 399 days.

(21) Appl. No.: 18/485,098

(22) Filed: Oct. 11, 2023

(65) Prior Publication Data

US 2025/0121386 A1 Apr. 17, 2025

(51) Int. Cl.
*B05B 5/025* (2006.01)
*B05B 5/08* (2006.01)

(52) U.S. Cl.
CPC ............ *B05B 5/0255* (2013.01); *B05B 5/087* (2013.01)

(58) Field of Classification Search
CPC ..... B05B 5/0255; B05B 5/087; B05B 5/0533; B05B 7/061; B05B 7/0892; B05D 1/04; B05C 19/025
See application file for complete search history.

(56) References Cited

U.S. PATENT DOCUMENTS 5,992,244 A * 11/1999 Pui ......................... B01J 19/088 73/865.5
6,105,886 A * 8/2000 Hollstein .............. B05B 3/1064 239/105
9,108,217 B2 * 8/2015 Hoerr ...................... A61L 27/54
9,248,217 B2 * 2/2016 Hoerr .................... A61L 29/085
10,252,289 B2 * 4/2019 Hoerr ...................... A61L 31/16
2003/0143315 A1 * 7/2003 Pui ............................ B05B 5/08 427/2.24
2006/0177573 A1 * 8/2006 Pui ............................ B05B 5/03 118/308
2006/0210909 A1 * 9/2006 Ohtani ....................... B01J 2/04 430/105
2008/0286679 A1 * 11/2008 Norikane .................. B29B 9/10 430/105
2011/0040147 A1 * 2/2011 O'Dea .................. A61M 15/02 128/200.14
2012/0048196 A1 * 3/2012 Pravert ..................... B05B 5/04 118/712

(Continued)

FOREIGN PATENT DOCUMENTS

CN 203904046 U 10/2014

*Primary Examiner* — Joseph A Greenlund
(74) *Attorney, Agent, or Firm* — Spencer Fane, LLP

(57) ABSTRACT

A nozzle assembly for a painting system including an outer wall, an inner wall and a pair of electrodes. The inner wall defines a paint passage through which paint is dispensed. The inner wall is spaced from the outer wall to define a fluid passage between an outer surface of the inner wall and an inner surface of the outer wall. The pair of electrodes extend circumferentially around an outer surface of the inner wall. The pair of electrodes are configured to be electrically connected to a power source. The fluid passage is configured to receive a fluid. Upon supplying power to the pair of electrodes, water droplets are separated from the fluid in the fluid passage and pass through the inner wall to coat an inner surface of the inner wall to facilitate movement of the paint through the paint passage.

19 Claims, 7 Drawing Sheets

(56) References Cited

U.S. PATENT DOCUMENTS

| | | | | |
|---|---|---|---|---|
| 2016/0310974 | A1* | 10/2016 | Mayer | B05B 5/087 |
| 2017/0128969 | A1* | 5/2017 | Yamauchi | B05B 3/1014 |
| 2021/0341370 | A1* | 11/2021 | Luthe | B01D 49/006 |
| 2023/0311139 | A1* | 10/2023 | Patil | B05B 7/0884 239/696 |
| 2024/0058827 | A1* | 2/2024 | Erickson | B05B 7/025 |
| 2024/0272126 | A1* | 8/2024 | Miyasaka | G01N 30/06 |
| 2025/0121386 | A1* | 4/2025 | Patil | B05B 5/043 |

* cited by examiner

VOLTAGE-ASSISTED PAINTING SYSTEM

BACKGROUND

Technical Field

The present disclosure generally relates to a nozzle assembly for a painting system. More specifically, the present disclosure relates to a nozzle assembly for a voltage-assisted painting system for applying paint to a vehicle body.

Background Information

Applying high viscosity paint is difficult with existing automotive paint systems. The higher the viscosity of the paint to be applied, the larger the force required to apply the paint.

SUMMARY

An object of the present disclosure is to provide a nozzle assembly for a painting system that facilitates dispensing a high viscosity paint.

In view of the state of the known technology, one aspect of the present disclosure is to provide a nozzle assembly for a painting system including an outer wall, an inner wall and a pair of electrodes. The inner wall defines a paint passage through which paint is dispensed. The inner wall is spaced from the outer wall to define a fluid passage between an outer surface of the inner wall and an inner surface of the outer wall. The pair of electrodes extend circumferentially around an outer surface of the inner wall. The pair of electrodes are configured to be electrically connected to a power source. The fluid passage is configured to receive a fluid. Upon supplying power to the pair of electrodes, water droplets are separated from the fluid in the fluid passage and pass through the inner wall to coat an inner surface of the inner wall to facilitate movement of the paint through the paint passage.

Another aspect of the present disclosure is to provide a voltage-assisted painting system including a housing, a power source, and a nozzle assembly. The housing has a conduit configured to receive paint from an external source. The nozzle assembly is disposed in the housing. The nozzle assembly has an inlet that is fluidly connected to the conduit and is configured to receive paint from the conduit. The nozzle assembly has an outlet configured to dispense the paint. The nozzle assembly includes an outer wall, an inner wall, and a pair of electrodes. The inner wall defines a paint passage through which paint is dispensed. The inner wall is spaced from the outer wall to define a fluid passage between an outer surface of the inner wall and an inner surface of the outer wall. The pair of electrodes extend circumferentially around the outer surface of the inner wall. The pair of electrodes are configured to be electrically connected to the power source. The fluid passage is configured to receive a fluid. Upon supplying power to the pair of electrodes, water droplets are separated from the fluid in the fluid passage and pass through the inner wall to coat an inner surface of the inner wall to facilitate movement of the paint through the paint passage.

Also other objects, features, aspects and advantages of the disclosed voltage-assisted painting system will become apparent to those skilled in the art from the following detailed description, which, taken in conjunction with the annexed drawings, discloses exemplary embodiments of the voltage-assisted painting system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 9:
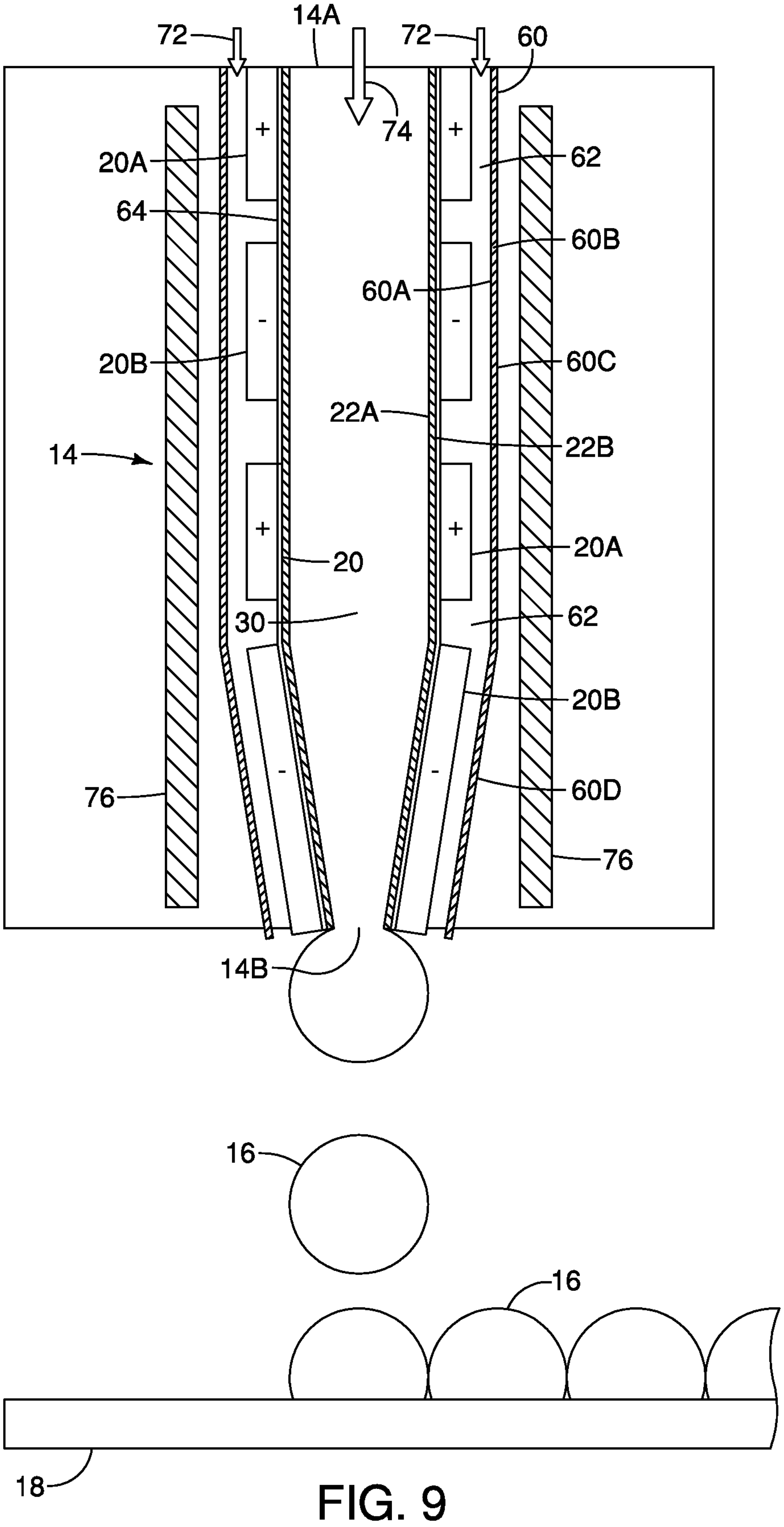
FIG. 9 is a cross sectional view of the nozzle assembly of FIG. 4 dispensing a high viscosity paint.

Referring initially to FIGS. 1-4, a voltage-assisted painting system 10 is illustrated in accordance with an exemplary embodiment. The voltage-assisted painting system 10 of the illustrated embodiment can be utilized for applying paint 16 to various types of substrates, such as a vehicle body 18 (FIG. 9). The voltage-assisted painting system 10 includes a housing 12 and at least one nozzle assembly 14. The housing 12 preferably houses a plurality of nozzle assemblies 14. In the illustrated embodiment, the voltage-assisted painting system 10 is illustrated as a multi-nozzle painting system. However, it will be apparent to those skilled in the vehicle field from this disclosure that the voltage-assisted painting system 10 can be utilized as a single nozzle assembly painting system.

In the illustrated embodiment, the term paint refers to any material including, but not limited to, one or more of the following substances: traditional paint, ink, polymers, water, solvents, and other fluids imparting color to a substrate and mixtures of the above-mentioned substances. Paint can also refer to material(s) having viscosities significantly higher and significantly lower than traditional paint viscosities.

The voltage-assisted painting system 10 of the illustrated embodiment uses capacitive deionization to control water droplet production. In particular, the voltage-assisted painting system 10 utilizes electrodes 20 to reduce friction along an inner wall 22 of a nozzle assembly 14. A voltage regulator 24 of the voltage-assisted painting system 10 is electrically connected to each of the electrodes 20 of the plurality of nozzle assemblies 14 to regulate voltage or electric current to the electrodes 20. The voltage-assisted painting system 10 can comprise one or more voltage regulators 24 that are connected to the nozzle assemblies 14 to deliver and regulate electric current or voltage to the electrodes 20. The voltage regulators 24 are illustrated as being connected to some of the nozzle assemblies 14 schematically for simplicity.

The electrodes 20 of the illustrated embodiment can be one or more solid electric conductors that is capable of carrying out an electric current or an electric field to the contents of the nozzle assemblies 14. The electrodes 20 are preferably made of good electric conducting materials, such as copper. As will be described, in the illustrated embodiment, the electrodes 20 can be provided as part of the nozzle assemblies 14 or can be provided exterior to the nozzle assemblies 14.

Figure 2:
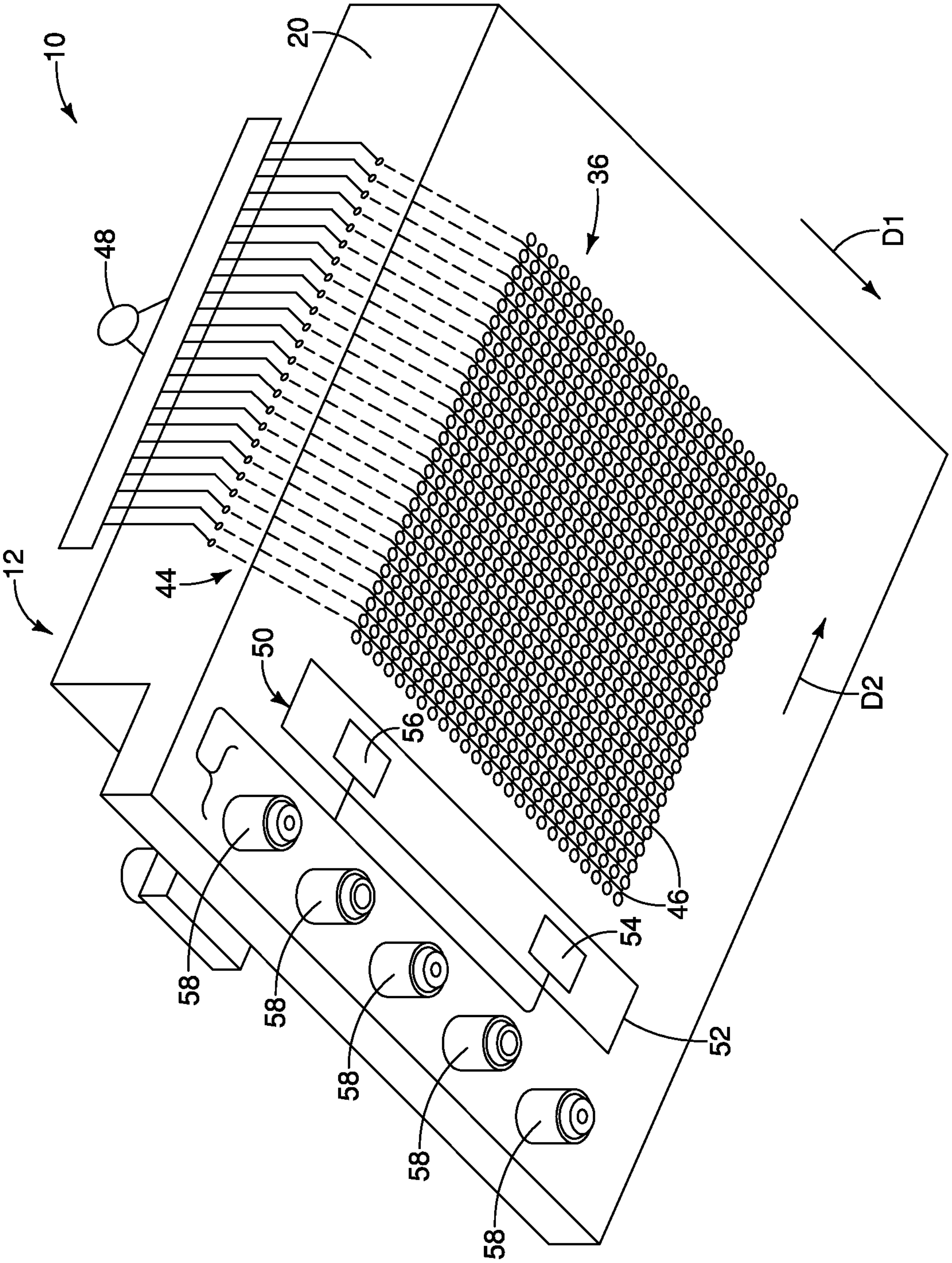
FIG. 2 is a perspective view of an underside of the housing of FIG. 1.
Figure 3:
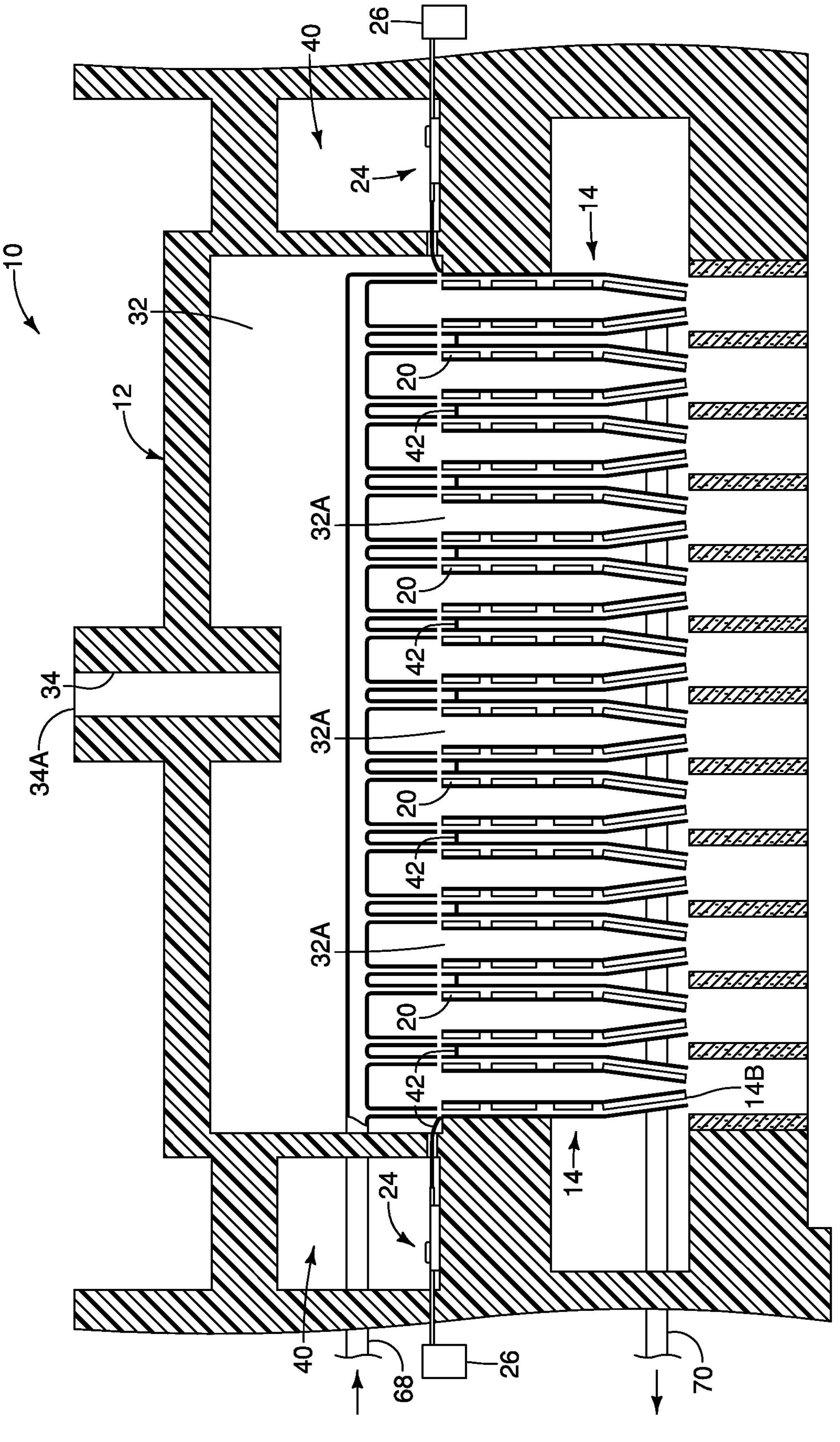
FIG. 3 is a cross sectional view of the housing of FIGS. 1 and 2.

As shown in FIG. 3, the voltage-assisted painting system 10 includes one or more voltage regulators 24 housed in the housing 12. As shown, the housing 12 includes a plurality of voltage regulators 24. In other words, the voltage-assisted painting system 10 of FIGS. 1 to 3 includes the plurality of nozzle assemblies 14 and can include one or more plurality of voltage regulators 24 each supplying electric current or voltage to the electrodes 20. The voltage-assisted painting system 10 is provided for paint application to a vehicle body 18 (FIG. 9) using assistance from the voltage regulators 24 and the electrodes 20. The housing 12 is preferably made of an electric insulating material, such as ceramic.

Figure 4:
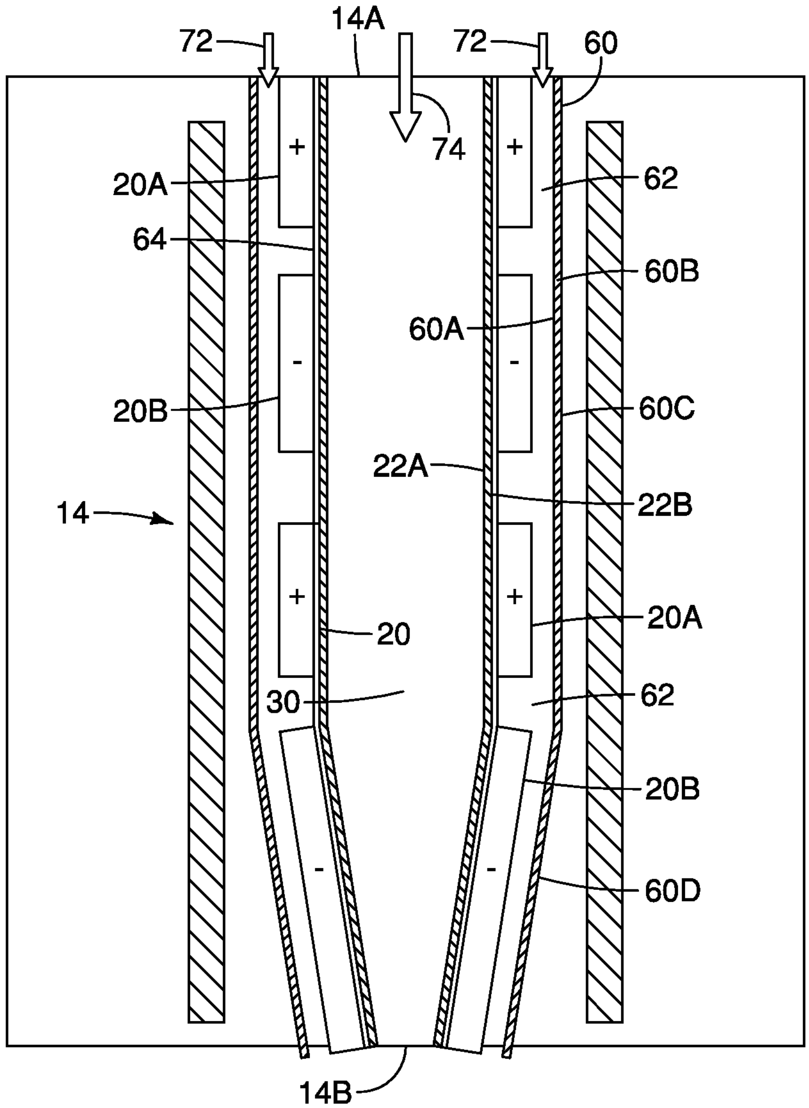
FIG. 4 is a cross sectional view of a nozzle assembly of the painting system of FIG. 1.
Figure 5:
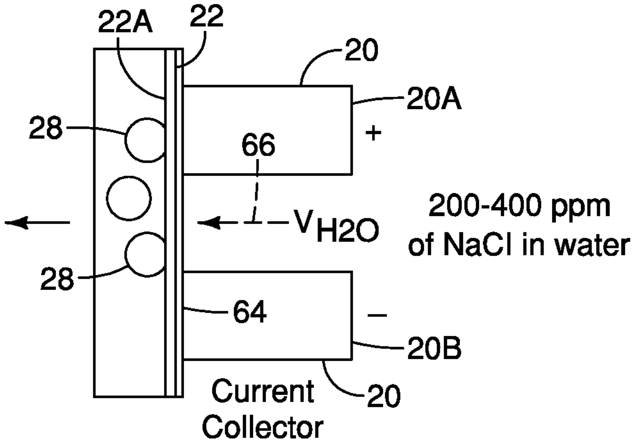
FIG. 5 is schematic illustration of generation of a water droplet in the nozzle assembly of FIG. 4.

As the voltage regulators 24 are identical, only one of the voltage regulators 24 will be further described herein. The voltage regulator 24 can include a circuit that creates and maintains a fixed output voltage. The voltage regulator 24 is connected to a power supply 26 that can be internally provided to the housing 12 or can be external to the housing 12. The applied voltage from the voltage regulator 24 produces an electrical potential difference over two electrodes 20 of the nozzle assembly 14. The electrical potential difference produces water droplets 28 along an inner surface 22A of the inner wall 22 of the nozzle assembly 14, as shown in FIGS. 4 and 5. The water droplets 28 reduce wall friction and/or adhesion between the paint in the paint passage 30 and the inner surface 22A of the wall 22. By reducing the friction and adhesion, less force is required to dispense high viscosity fluid, such as paint, out of the nozzle assembly 14. The size of the nozzle assembly 14 is reduced, thereby increasing the resolution of the painting system 10.

The voltage-assisted painting system 10 can further utilize a series of air flow channels to apply gas to the droplets at the nozzles 14. Therefore, the voltage-assisted painting system 10 can utilize a combination of capacitive deionization and air flow application to facilitate droplet formation, as will be further described below. The voltage-assisted painting system 10 preferably applies argon (Ar), helium (He) or nitrogen ($N_2$) gas to the droplets that are formed at the nozzle assemblies 14 to help pull or discharge the droplets from the nozzle assemblies 14 by providing further momentum to the droplets, as will be further described below. Preferably, the application of air from the air flow channels also helps spray the formed droplets such that the housing 12 can act as a spray chamber.

Referring to FIG. 3, the housing 12 includes a reservoir 32 for storing paint. The housing 12 includes a conduit 34 that fluidly receives paint from an external source (not shown) to be stored in the reservoir 32. The conduit 34 fluidly connects the reservoir 32 with the external source to receive paint into the housing 12. The conduit 34 includes an opening that defines an inlet 34A that can be considered an inlet 22A for the housing 12. While the housing 12 is illustrated as being provided with the reservoir 32 therein, it will be apparent to those skilled in the vehicle field from this disclosure that the housing 12 can be modified such that the conduit 34 connects directly to the nozzle assemblies 14. That is, it will be apparent to those skilled in the vehicle field from this disclosure that the housing 12 does not need to include the reservoir 32. Rather, a reservoir can be provided separately from the housing 12 to deliver paint into the housing 12. Therefore, it will be apparent to those skilled in the vehicle field from this disclosure that the voltage-assisted painting system 10 can include a reservoir that is separately provided from the housing 12.

As shown in FIG. 2, the housing 12 includes a plurality of outlets 36 positioned at an underside surface that is opposite side on the housing 12 with respect to the conduit 34. The paint is dispensed from the outlets 36 to be applied to the vehicle body. In the illustrated embodiment, each of the outlets 36 of the housing 12 corresponds to one of the nozzle assemblies 14. That is, the outlets 36 of the housing 12 receive paint from the nozzle assemblies 14 to dispense, as will be further described. While the housing 12 is illustrated as including a single conduit 22 it will be apparent to those skilled in the vehicle field from this disclosure that the housing 12 can include a plurality of conduits 22 for receiving different colors and/or types of paint. Additionally, while the housing 12 is illustrated as including a single reservoir 32 that is fluidly connected to all of the nozzle assemblies 14, it will be apparent to those skilled in the vehicle field from this disclosure that the housing 12 can include a plurality of reservoirs 32 for storing different colors and/or types of paint.

As best seen in FIG. 3, the reservoir 32 is a space that receives paint from the conduit 34. The reservoir 32 is preferably is small feedstock reservoir that does not add significant weight to the housing 12. Thus, the reservoir 32 is configured to continuously receive paint from the conduit 34 during use of the voltage-assisted painting system 10. The reservoir 32 includes a plurality openings 32A that extend into the nozzle assemblies 14. The housing 12 can further includes a plurality of channels 38 that receive paint from the nozzle assemblies 14. The channels 38 include the outlets 36 of the housing 12 that open to the exterior. Therefore, the channels 38 are fluidly connected to the nozzle assemblies 14 to receive paint from the reservoir 32.

Thus, the nozzle assemblies 14 are fluidly connected to the reservoir 32 and the outlets 36 of the housing 12. That is, the nozzle assemblies 14 fluidly connect the reservoir 32 with the outlets 36 of the housing 12 to dispense the paint. As seen in FIG. 3, each of the nozzle assemblies 14 has an inlet 14A and an outlet 14B. The inlets 14A of the nozzle assemblies 14 are fluidly connected to the conduit 34 to receive paint. Each of the outlets 14B of the nozzle assemblies 14 dispenses paint into respective ones of the channels 38 that lead to the outlets 36 of the housing 12. Therefore, each of the nozzle assemblies 14 has an outlet 14B that dispenses paint. It will be apparent to those skilled in the vehicle field from this disclosure that the housing 12 can be reconfigured without the channels 38. Therefore, the outlets 14B of the nozzle assemblies 14 can alternatively extend directly to the exterior of the housing 12.

As shown in FIG. 3, the nozzle assemblies 14 are shaped as tubes having a consistent volume along the longitudinal lengths of the nozzle assemblies 14. The nozzle assemblies 14 preferably taper towards the outlets 14B so to decrease the volume of the nozzle assemblies 14 near the outlets 14B to the formation of small droplets at the nozzle assemblies 14 and increase the frequency of droplet formation.

As shown in FIG. 3, the housing 12 further includes a chamber 40 that houses the voltage regulators 24. In other words, the voltage regulators 24 are disposed in the chamber

40. The chamber 40 is positioned between the reservoir 32 and the channels 38. Therefore, the voltage regulators 24 are positioned between the reservoir 32 and the channels 38. The outlets 14B of the nozzle assemblies 14 are disposed in the channels 38.

In the illustrated embodiment, a direction of paint flow flows from the conduit 34, to the reservoir 32, to the nozzle assemblies 14, to the channels 38, and to the outlets 36. That is, the reservoir 32 is upstream of the nozzle assemblies 14 and the nozzle assemblies 14 are upstream of the outlets 36. In the illustrated embodiment, the chamber(s) 40 that houses the voltage regulator(s) 24 are disposed downstream of the reservoir 32 and upstream of the outlets 36 of the housing 12. As best seen in FIG. 3, the chamber 40 is upstream of the outlets 14B of the nozzle assemblies 14. That is, the voltage regulators 24 are preferably upstream of the outlets 14B of the nozzle assemblies 14.

As shown in FIG. 3, each of the plurality of nozzle assemblies 14 of the illustrated embodiment are in electric communication with each other. In particular, the nozzle assemblies 14 are electrically connected together via electrical conductors 42. The voltage regulators 24 are electrically connected to one of the nozzle assemblies 14 so that the electrical charge or voltage provided to the nozzle assembly 14 can be transmitted through all of the nozzles 14 via the electrical conductors 42. The voltage regulators 24 can be connected to the electrodes 20 of the nozzle assembly 14 via one or more electrical wires.

As shown in FIG. 2, the housing 12 includes a first airflow channel 44 and a second airflow channel 46. The first airflow channel 44 extends through the channels 38 in a first direction D1 to enable external air to flow through the channels 38 in the first direction D1. The second airflow channel 46 extends through the channels 38 in a second direction D2 that is transverse to the first direction D1 to enable external air to flow in the second direction D2. The first and second airflow channels 44 and 46 are arranged and configured to generate air flow forces to help detach the droplets from the outlets 14B of the nozzle assemblies 14. In particular, air flow forces can be directed towards the droplets. Alternatively, air flow can enter the channels 38 tangentially from the first airflow channel 44 to create a swirling moment at the droplets that have been detached from the outlets 14B.

Figure 1:
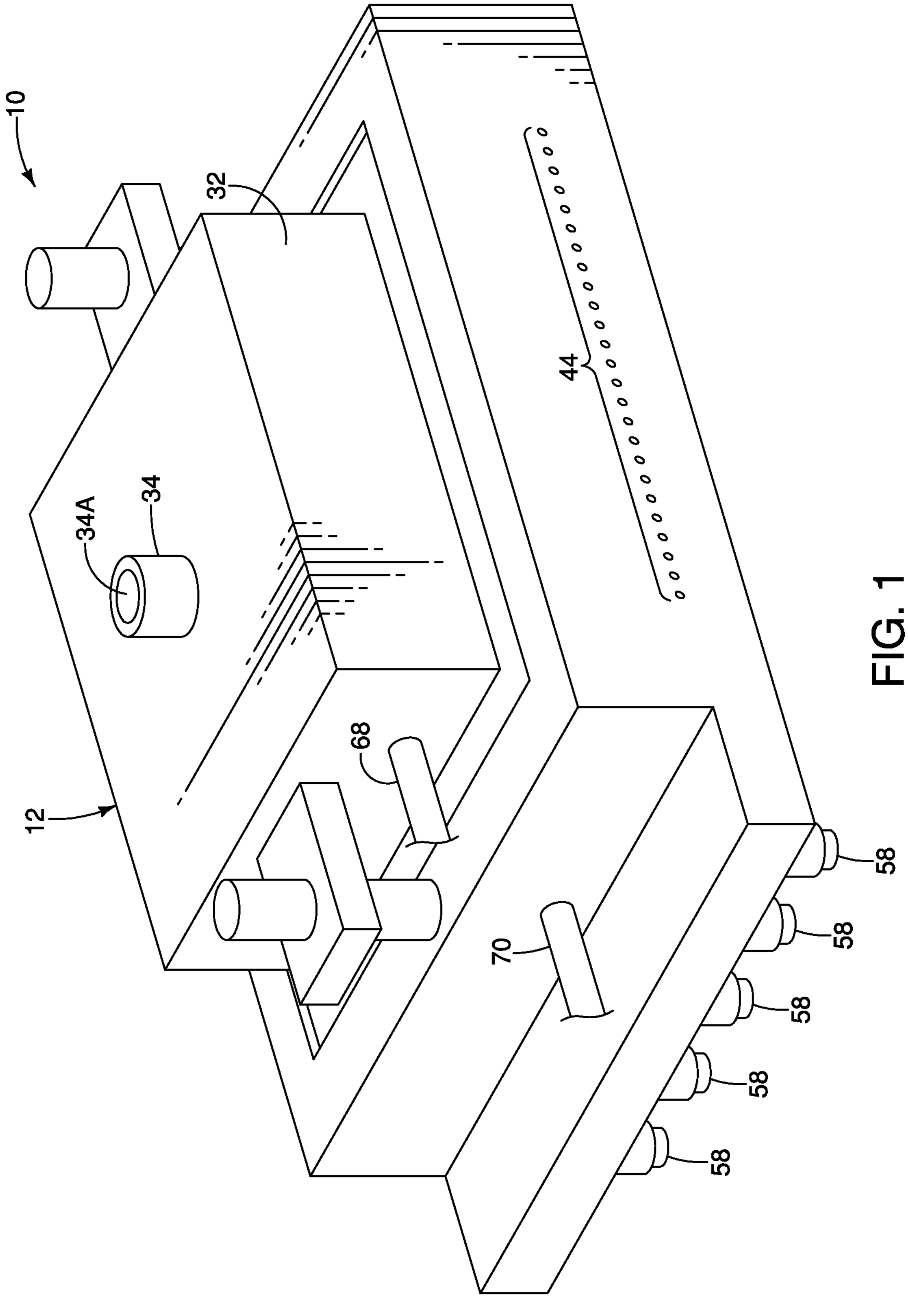
FIG. 1 is a perspective view of a housing for a painting system in accordance with an exemplary embodiment.

The first airflow channel 44 opens to the exterior of the housing 12, as shown in FIGS. 1 and 2. The voltage-assisted painting system 10 further includes an external airflow source, such as an air pump 48. The air pump 48 is in direct communication with the first airflow channel 44 to pump air from the exterior of the housing 12 into the first airflow channel 44. The first and second airflow channels 44 and 46 are in communication with each other such that air flows from the first airflow channel 44 to the second airflow channel 46.

The second airflow channels 46 intersect with the channels 38 of the housing 12 to enable airflow from the second airflow channels 46 to the channels 38. The second airflow channels 46 intersect with the channels 38 at a location in the vicinity of the outlets 14B of the nozzle assemblies 14 so that air from the second airflow channels 46 is applied to the droplets dispensed from the outlets 14B of the nozzle assemblies 14.

In the illustrated embodiment, air flow forces flow from the air pump 48, to the first airflow channels 44, to the second airflow channels 46, and to the channels 38. In this way, air is pumped from the exterior to the channels 38 to apply airflow forces that will help push the droplets that have been detached from the outlets 14B downward into the channels 38. Therefore, the air flows through the first and second airflow channels 44 and 46 to apply airflow force to the nozzle assemblies 14.

As shown in FIGS. 2 and 3, the nozzle assemblies 14 are arranged in an array of successive rows and columns within the housing 12. Each of the nozzle assemblies 14 preferably has the same size and dimension with respect to each other to ensure uniformity of the droplets that are formed. The inlets 14A of the nozzle assemblies 14 have any suitable diameter, such as approximately 250 micros (μm) in diameter. The droplets formed at the outlets 14B of the nozzle assemblies 14 have any suitable size, such as a size between 50 μm to 100 μm.

As shown in FIG. 2, the voltage-assisted painting system 10 of the illustrated embodiment can include a control system 50 programmed to control the components of the housing 12, such as the nozzle assemblies 14 and the voltage regulators 24. The control system 50 can include an electronic controller 52 for controlling the nozzle assemblies 14 and voltage regulators 24, either in combination or selectively as will be described below. The electronic controller 52 is preferably a microcomputer that includes one or more processor(s) 54 and one or computer memory device(s) 56.

The electronic controller 52 can control the voltage regulators 24 to apply voltage to the nozzle assemblies 14 as the paint is traveling down the bodies of the nozzle assemblies 14. The electronic controller 52 can also control the voltage regulators 24 to adjust the voltage level that is applied to the electrodes 20. The electronic controller 52 can control the voltage regulators 24 to control the formation of the water droplets 28 and to regenerate the electrodes.

The control system 50 can include memory 56, such as any computer storage device or any computer readable medium with the sole exception of a transitory, propagating signal. For example, the memory 56 can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM device, a hard disk, a flash drive, etc. The memory 56 is configured to store settings, programs, data, calculations and/or results of the processor(s) 54.

The electronic controller 52 can be programmed to control the sequence, frequency and/or the voltage level emitted by the voltage regulators 24. For example, the electronic controller 52 can be programmed to modulate the electrodes 20 to change the oscillation (e.g. frequency, phase and/or amplitude) of the voltage emitted by the voltage regulators 24.

The housing 12 can include one or more detector(s) (not shown) disposed at the nozzle assemblies 14 or in the vicinity of the nozzle assemblies 14 to detect the presence and size of droplets forming at the outlets 14B of the nozzle assemblies 14. The detectors can be any type of sensor as needed and/or appropriate. For example, the detector(s) can utilize thermal imaging or acoustic imaging to measure a size or profile of the droplets. The detectors can be equipped with wireless communication devices to send detection signals to the electronic controller 52. The memory 56 of the electronic controller 52 can store parameters for the frequencies emitted by the electrodes 20. The memory 56 can be programmed to set these parameters or programmed to pre-store these parameters.

As shown in FIGS. 1 and 2, the voltage-assisted painting system 10 can further include an inspection system for quality insurance of the paint application. For example, the inspection includes one or more detectors, such as cameras 58, for detecting the paint that is dispensed from the outlets 36 of the housing 12. As shown, the cameras 58 are preferably disposed on a bottom side of the housing 12 in the vicinity of the outlets 36 of the housing 12. The cameras 58 can utilize thermal imaging or acoustic imaging to measure a size or profile of the droplets that are ejected from the outlets 36 of the housing 12. The cameras 58 are in electronic communication with the electronic controller 52 via wired or wireless communication device(s). The electronic controller 52 can be programmed to measure a thickness or uniformity of the paint that is applied to the vehicle body based on the information detected by the cameras 58.

As shown in FIGS. 3, 4 and 6-9, each nozzle assembly 14 includes an outer wall 60, the inner wall 22, and at least one pair of electrodes 20. The outer wall 60 has an inner surface 60A and an outer surface 60B. The outer wall 60 has a first portion 60C having a substantially constant diameter, and a second portion 60D that tapers to the nozzle outlet 14B. The outer wall 60 is made of any suitable material, such as a metal.

The inner wall 22 is disposed within the outer wall 60. The inner wall 22 defines the paint passage 30 through which paint is dispensed. The inner wall 22 is spaced from the outer wall 60 to define a fluid passage 62 between an outer surface 22B of the inner wall 22 and an inner surface 60A of the outer wall 60. The pair of electrodes extend circumferentially around the outer surface 22B of the inner wall 22. The pair of electrodes 20 are configured to be electrically connected to the power source 26, as shown in FIG. 3. The fluid passage 62 is configured to receive a fluid, such as a saline solution. Upon supplying power to the pair of electrodes 20, water droplets 28 are separated from the fluid in the fluid channel 62 and pass through the inner wall 2 to coat the inner surface 22A of the inner wall 22 to facilitate movement of the paint through the paint passage 30. The inner wall 22 is made of any suitable material that allows water to pass through the inner wall 22 from the fluid passage 62 to the paint passage 30, such as a nanoporous or mesoporous material, such as a porous stainless steel.

Figure 6:
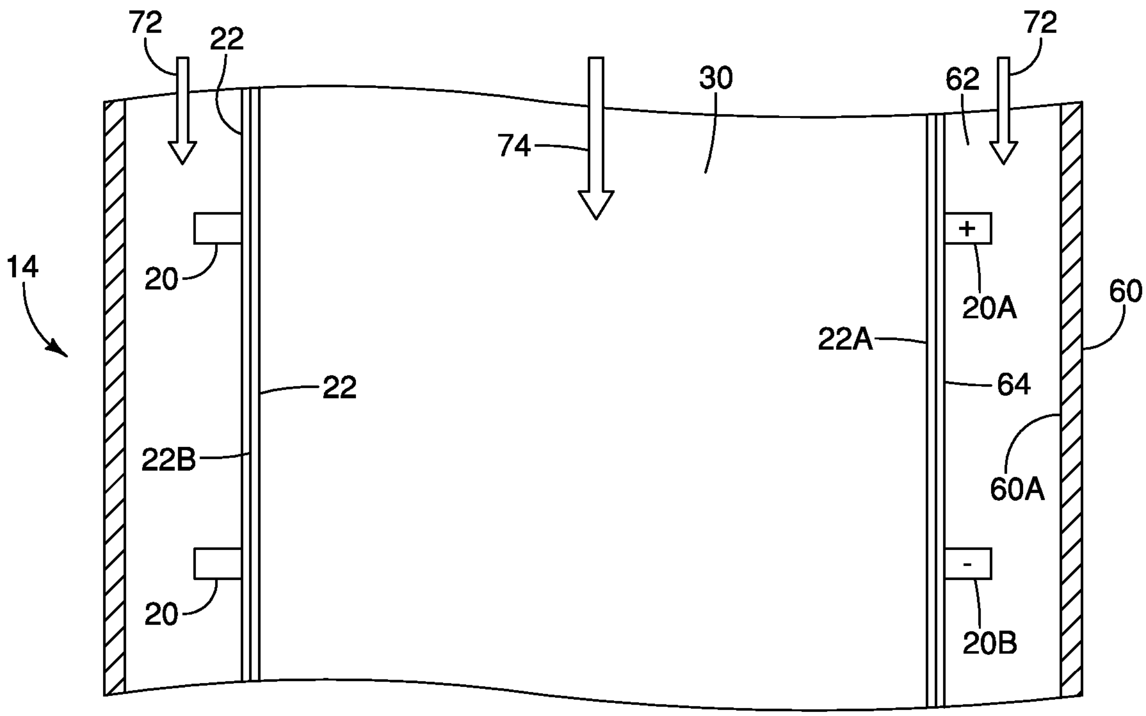
FIG. 6 is a cross sectional view of the nozzle assembly of FIG. 4.
Figure 7:
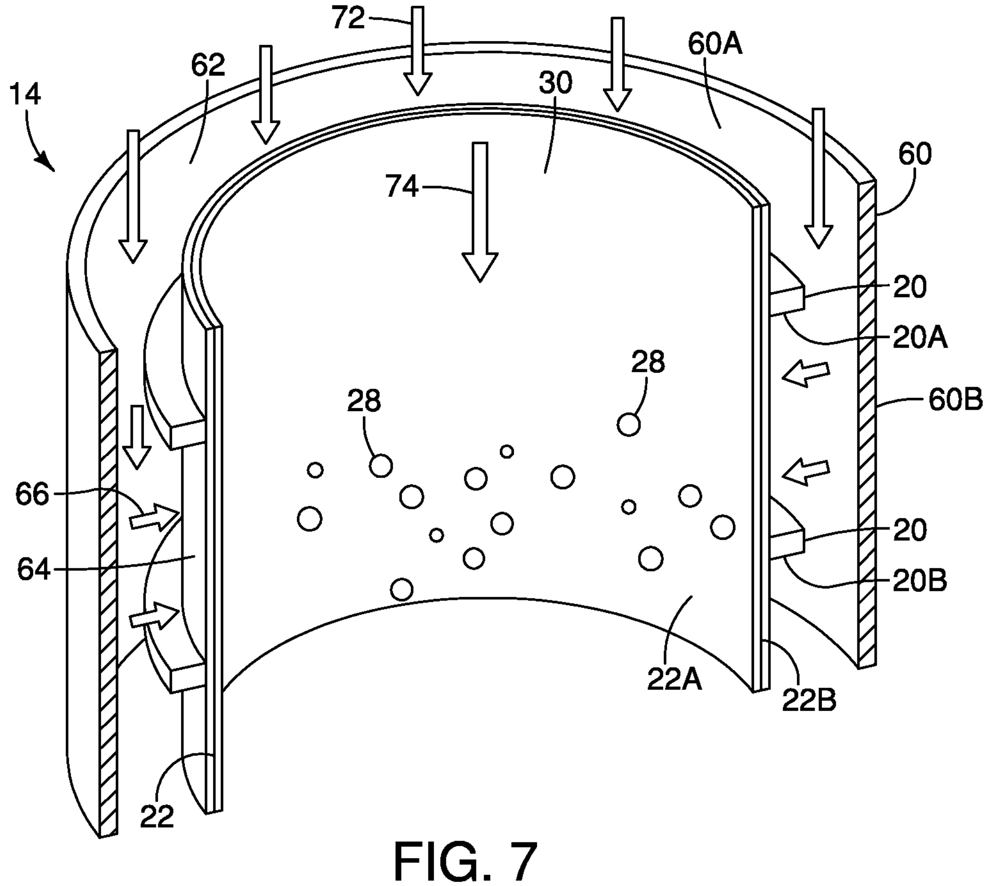
FIG. 7 is a perspective view in partial cross section of the nozzle assembly of FIG. 4.

As shown in FIGS. 6 and 7, an insulator 64 is disposed on the outer surface 22B of the inner wall 22. An inner surface 64A of the insulator 64 contacts the outer surface 22B of the inner wall 22. An outer surface 64B of the insulator 64 defines an inner wall of the fluid passage 62. The insulator 64 is made of a porous material to facilitate water passing from the fluid passage 62 to the paint passage 30. The insulator 64 also electronically isolates the inner wall 22 from the electrodes 20 disposed thereon. The insulator is made of any suitable material, such as polytetrafluoroethylene.

The pair of electrodes 20 extend circumferentially around the outer surface 22B of the inner wall 22, as shown in FIGS. 4 and 6-9. The electrodes 20 are disposed on the outer surface 64B of the insulator 64. The electrodes 20 include at least one pair of electrodes 20A and 20B. The first electrode 20A is a cation having a positive charge. The second electrode 20B is an anion having a negative charge. A plurality of pairs of electrodes can be disposed to extend circumferentially around the outer surface 22B of the inner wall 22 to control water droplet production along a length of the nozzle assembly 10. The electrodes 20 are preferably disposed in pairs to apply an electrical potential difference between the first and second electrodes 20A and 20B of each pair of electrodes 20. Each electrode 20 is electrically connected by an electrical conductor 42 to the power source 26. The electrodes are made of any suitable material, such as carbon or a carbon derivative.

As shown in FIG. 5, supplying power to the electrodes 20 applies an electrical potential difference over the first and second electrodes 20A and 20B. A low voltage is supplied to the electrodes 20 by the power supply 26, such as a voltage between 1.0 to 1.4 volts, inclusive. Fluid, such as a saline solution having 200-400 ppm of NaCl in water, is passed over the electrodes 20. The charged salt ions, such as sodium and chlorine, are attracted to the first and second electrodes 20A and 20B, removing the salt ions from the saline solution. The charged salt ions are retained by the first and second electrodes 20A and 20B while the electrical potential difference is applied by supplying the voltage to the electrodes. The water, having the salt ions removes, is caused to move in a direction substantially perpendicular to the direction of the electric field, as indicated by directional arrow 66 in FIG. 5. The water passes through the porous insulator 64 and the porous inner wall 22 to form water droplets 28 on the inner surface 22A of the inner wall 22. The power supply 26 reverses or reduces to zero the electrical potential difference between the first and second electrodes 20A and 20B such that saline solution flushes the stored salt ions from the first and second electrodes 20A and 20B to regenerate the first and second electrodes 20A and 20B.

As shown in FIGS. 1 and 3, a fluid inlet 68 supplies fluid to the nozzle assemblies 14, and a fluid outlet 70 discharges fluid from the nozzle assemblies 14. The fluid is supplied to the nozzle assemblies 14 through the fluid inlet 68. Paint is supplied to the nozzle assemblies 14 through the conduit 34. As shown in FIGS. 6, 7 and 9, directional arrow 72 indicates fluid supplied to the fluid passage 62 of each nozzle assembly 14. Directional arrow 74 indicates paint supplied to the paint passage 30 of each nozzle assembly 14. The paint is preferably a high viscosity paint. The paint preferably has a centipoise of at 100.

Power is supplied to the electrodes 20 to apply an electrical potential difference between each pair of first and second electrodes 20A and 20B. The charged ions, such as the salt ions, are removed from the fluid, such as the saline solution, by the electrical potential difference between the first and second electrodes 20A and 20B. The water created by the ions removed from the solution is caused to move in a direction substantially perpendicular to the electrical field, as indicated by the directional arrow 66 in FIG. 7. The water passes through the porous insulator 64 and the porous inner wall 22 to form water droplets 28 on the inner surface 22A of the inner wall 22. The water droplets 28 reduce friction along the inner surface 22A of the inner wall 22, thereby reducing wall friction and adhesion with the paint passing through the paint passage 30. The reduced friction and adhesion allows the nozzle assembly 14 to dispense high viscosity paint, such as paint having a centipoise of 100 or larger, without necessitating a large force to be applied to the paint supplied to the nozzle assemblies 14. The paint droplets 16 generated by the nozzle assemblies 14 are applied to a substrate, such as a vehicle body 18, as shown in FIG. 9.

Figure 8:
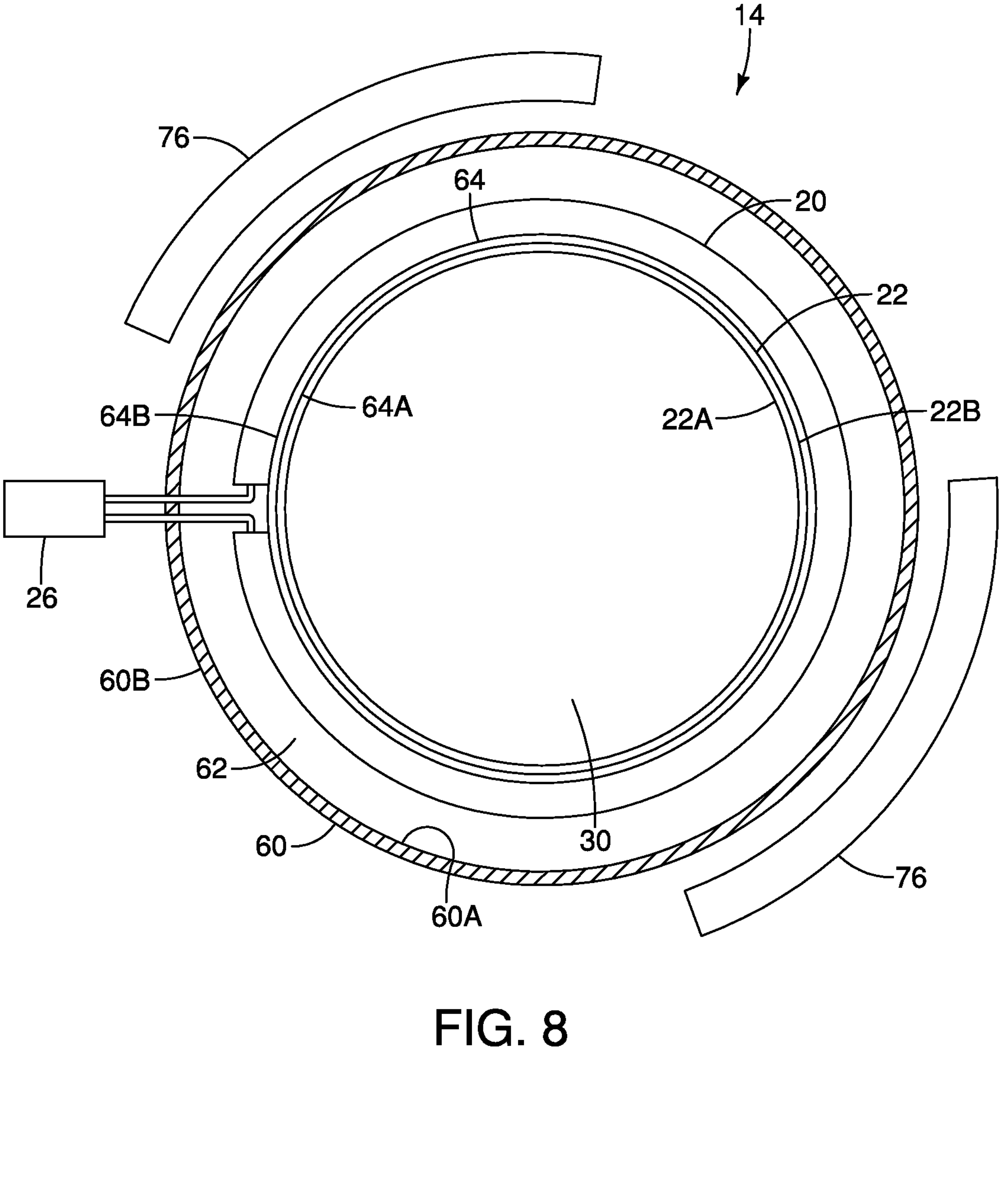
FIG. 8 is a top plan view of the nozzle assembly of FIG. 4.

The nozzle assembly 14 can further include a transducer 76, such as a piezo transducer, as shown in FIGS. 4, 8 and 9. The transducer 76 is disposed adjacent to the outer wall 60. As shown in FIG. 8, first and second transducers 76 are diametrically opposed with respect to the inner wall 22 of the nozzle assembly 14 and spaced from the outer wall 60. Alternatively, the transducers 76 can be disposed directly on the outer surface 60B of the outer wall 60. The transducers 76 are configured to vibrate the inner wall 22 to further reduce wall drag and adhesion with the paint passing through the paint passage 30, as well as facilitating paint droplet formation at the nozzle outlet 14B.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the voltage-assisted painting system. Accordingly, these terms, as utilized to describe the present invention should be interpreted relative to a vehicle equipped with the voltage-assisted painting system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A nozzle assembly for a painting system, the nozzle comprising:

an outer wall;

an inner wall defining a paint passage through which a paint is dispensed, the inner wall being spaced from the outer wall to define a fluid passage between an outer surface of the inner wall and an inner surface of the outer wall; and a pair of electrodes extending circumferentially around the outer surface of the inner wall, the pair of electrodes being configured to be electrically connected to a power source, the fluid passage being configured to receive a fluid, upon supplying power to the pair of electrodes, water droplets are separated from the fluid in the fluid passage and pass through the inner wall to coat an inner surface of the inner wall to facilitate movement of the paint through the paint passage.

2. The nozzle assembly for the painting system according to claim 1, wherein the fluid is a saline solution.

3. The nozzle assembly for the painting system according to claim 1, wherein an insulator is disposed on the outer surface of the inner wall.

4. The nozzle assembly for the painting system according to claim 3, wherein the insulator is made of polytetrafluoroethylene.

5. The nozzle assembly for the painting system according to claim 1, wherein the inner wall is made of a porous stainless steel.

6. The nozzle assembly for the painting system according to claim 1, wherein the pair of electrodes are made of carbon.

7. The nozzle assembly for the painting system according to claim 1, wherein a transducer is disposed adjacent the outer wall, the transducer being configured to vibrate the inner wall.

8. The nozzle assembly for the painting system according to claim 1, wherein a plurality of pairs of electrodes extend circumferentially around the outer surface of the inner wall.

9. The nozzle assembly for the painting system according to claim 1, wherein the nozzle is configured to dispense the paint having a centipoise of at least 100.

10. A voltage-assisted painting system comprising:

a housing having a conduit configured to receive a paint from an external source;

a power source; and a nozzle assembly disposed in the housing, the nozzle assembly having an inlet that is fluidly connected to the conduit and configured to receive the paint from the conduit, the nozzle assembly having an outlet configured to dispense the paint, the nozzle assembly including an outer wall;

an inner wall defining a paint passage through which the paint is dispensed, the inner wall being spaced from the outer wall to define a fluid passage between an outer surface of the inner wall and an inner surface of the outer wall; and a pair of electrodes extending circumferentially around the outer surface of the inner wall, the pair of electrodes being configured to be electrically connected to the power source, the fluid passage being configured to receive a fluid, upon supplying power to the pair of electrodes, water droplets are separated from the fluid in the fluid passage and pass through the inner wall to coat an inner surface of the inner wall to facilitate movement of the paint through the paint passage.

11. The voltage-assisted painting system according to claim 10, wherein the fluid is a saline solution.

12. The voltage-assisted painting system according to claim 10, wherein an insulator is disposed on the outer surface of the inner wall.

13. The voltage-assisted painting system according to claim 12, wherein the insulator is made of polytetrafluoroethylene.

14. The voltage-assisted painting system according to claim 10, wherein the inner wall is made of a porous stainless steel.

15. The voltage-assisted painting system according to claim 10, wherein the pair of electrodes are made of carbon.

16. The voltage-assisted painting system according to claim 10, wherein a transducer is disposed adjacent the outer wall, the transducer being configured to vibrate the inner wall.

17. The voltage-assisted painting system according to claim 10, wherein a plurality of pairs of electrodes extend circumferentially around the outer surface of the inner wall.

18. The voltage-assisted painting system according to claim 10, wherein the power source is configured to supply a voltage to the pair of electrodes, the voltage being between 1.0 and 1.4 volts, inclusive.

19. The voltage-assisted painting system according to claim 10, wherein the paint has a centipoise of at least 100.

* * * * *